United States Patent [19]
Fant et al.

[11] Patent Number: 5,640,640
[45] Date of Patent: Jun. 17, 1997

[54] MULTIPLE EXPOSURE-FORMAT CAMERA

[75] Inventors: Alfred Bruce Fant, Rochester; Daniel Loyd Guilliams, Jr., Hilton; David Allan Hodder, Spencerport, all of N.Y.

[73] Assignee: Eastman Kodak Company, Rochester, N.Y.

[21] Appl. No.: 612,039

[22] Filed: Mar. 7, 1996

[51] Int. Cl.⁶ ............................................. G03B 17/00
[52] U.S. Cl. ............................................. 396/435
[58] Field of Search ............. 354/94, 159; 396/335, 396/435

[56] References Cited

U.S. PATENT DOCUMENTS

| | | | |
|---|---|---|---|
| 997,886 | 7/1911 | West | 354/124 |
| 999,949 | 8/1911 | Bell | 354/159 |
| 1,032,867 | 7/1912 | Steadman et al. | 354/159 |
| 1,272,227 | 7/1918 | Crothers | 354/159 |
| 1,352,134 | 9/1920 | Johnson | 354/159 |
| 1,366,876 | 1/1921 | Colter | 354/159 |
| 1,503,302 | 7/1924 | Cocanari | 354/159 |
| 1,509,399 | 9/1924 | Feltenstein | 354/159 |
| 4,583,831 | 4/1986 | Harvey | 354/106 |

*Primary Examiner*—Safet Metjahic
*Assistant Examiner*—Christopher E. Mahoney
*Attorney, Agent, or Firm*—Roger A. Fields

[57] ABSTRACT

A multiple exposure-format camera comprises an exposure opening having an aspect ratio, and a flexible curtain-mask provided with a plurality of mask openings having respective aspect ratios that are different than the aspect ratio of the exposure opening. The curtain-mask is supported for movement from one storage chamber to another storage chamber to successively locate the mask openings at the exposure opening to change the aspect ratio for the exposure opening. At least one of the storage chambers is configured to receive a film container to store a portion of the curtain-mask about the film container. This allows the camera to be made relatively compact.

7 Claims, 4 Drawing Sheets

MULTIPLE EXPOSURE-FORMAT CAMERA

FIELD OF THE INVENTION

The invention relates generally to the field of photography, and in particular to cameras capable of making different format exposures. More specifically, the invention relates to a multiple exposure-format camera provided with masking means for changing the aspect ratio of the exposure opening in the camera to make different format exposures.

BACKGROUND OF THE INVENTION

Prior art U.S. Pat. No. 1,509,399, issued Sep. 23, 1924, discloses a multiple exposure-format camera comprising an exposure opening having an aspect ratio, a flexible curtain-mask provided with a plurality of mask openings having respective aspect ratios that are different than the aspect ratio of the exposure opening, and means supporting the curtain-mask for movement from one storage chamber for the curtain-mask to another storage chamber for the curtain-mask to successively locate the mask openings at the exposure opening to change the aspect ratio for the exposure opening. Thus, film exposures having various aspect ratios, i.e. different formats, can be obtained.

SUMMARY OF THE INVENTION

A multiple exposure-format camera comprising an exposure opening having an aspect ratio, a flexible curtain-mask provided with a plurality of mask openings having respective aspect ratios that are different than the aspect ratio of the exposure opening, and means supporting the curtain-mask for movement from one storage chamber for the curtain-mask to another storage chamber for the curtain-mask to successively locate the mask openings at the exposure opening to change the aspect ratio for the exposure opening, is characterized in that:

at least one of the storage chambers is configured to receive a film container to store a portion of the curtain-mask about the film container. Thus, this design provides a more concise arrangement than is shown in prior art U.S. Pat. No. 1,509,399.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
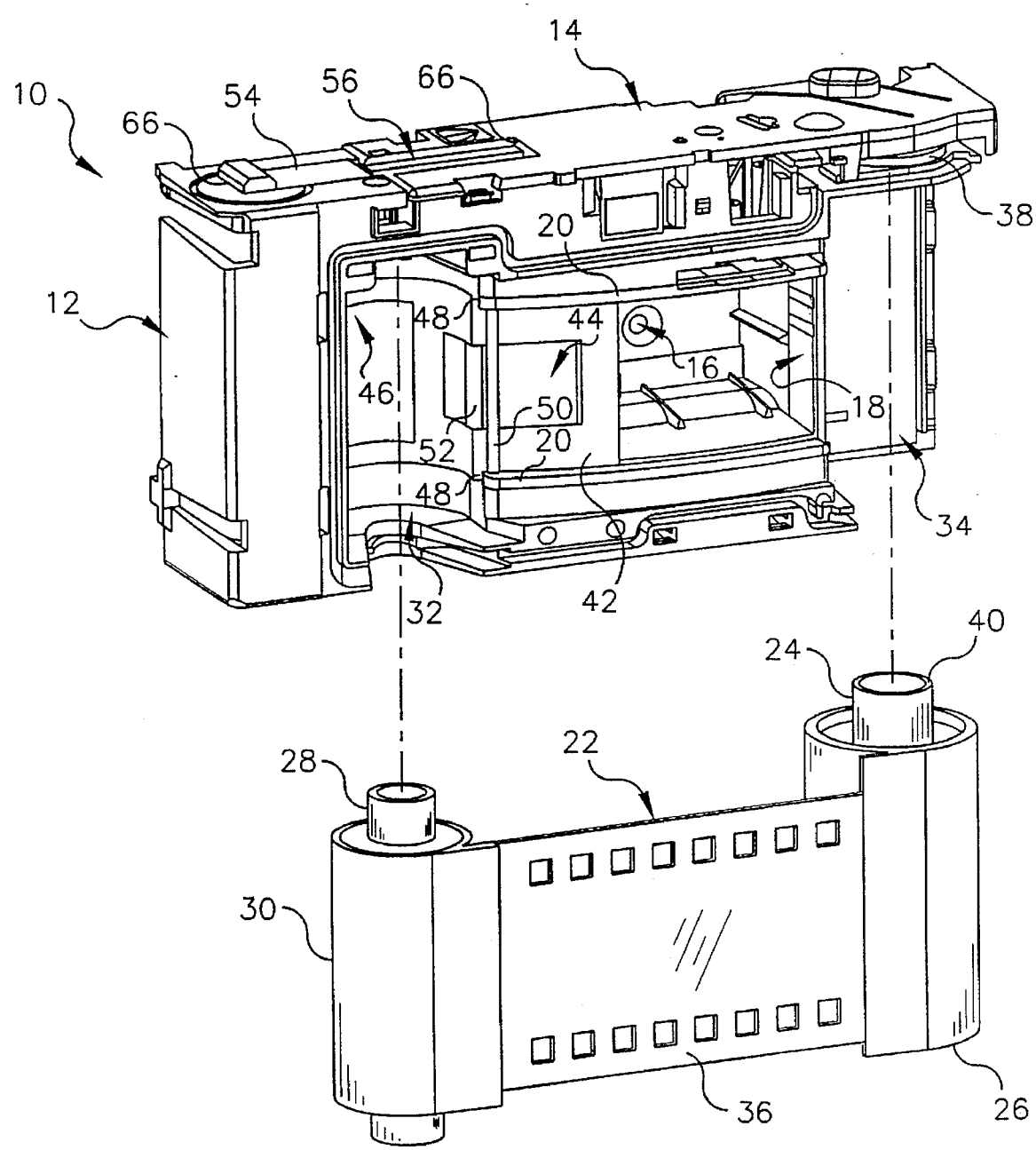
FIGS. 1, 2 and 3 are exploded perspective views of a multiple exposure-format camera according to a preferred embodiment of the invention, showing a curtain-mask in a non-masking position in FIG. 1 and in two different masking positions in FIGS. 2 and 3.
Figure 2:
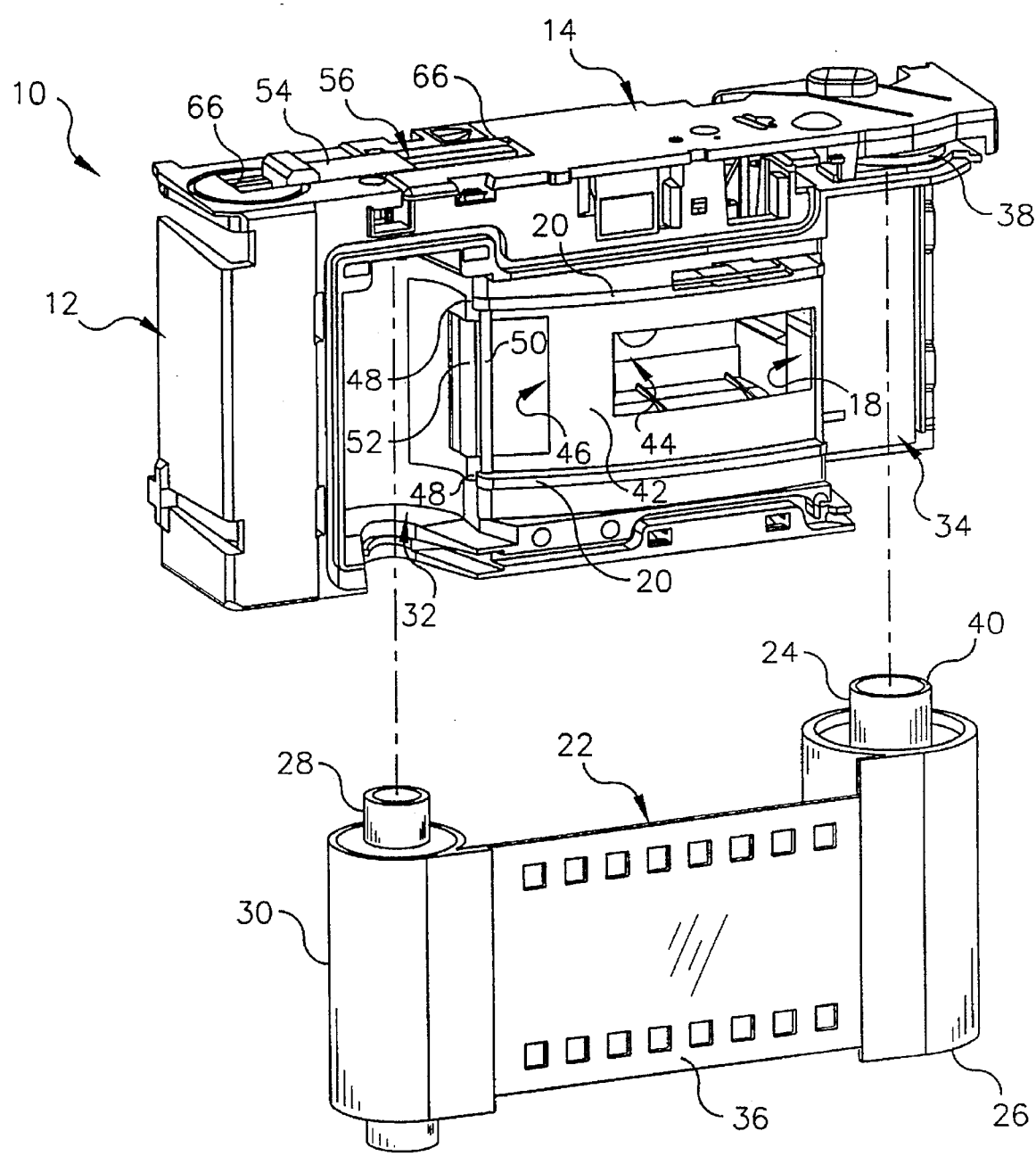
Figure 3:
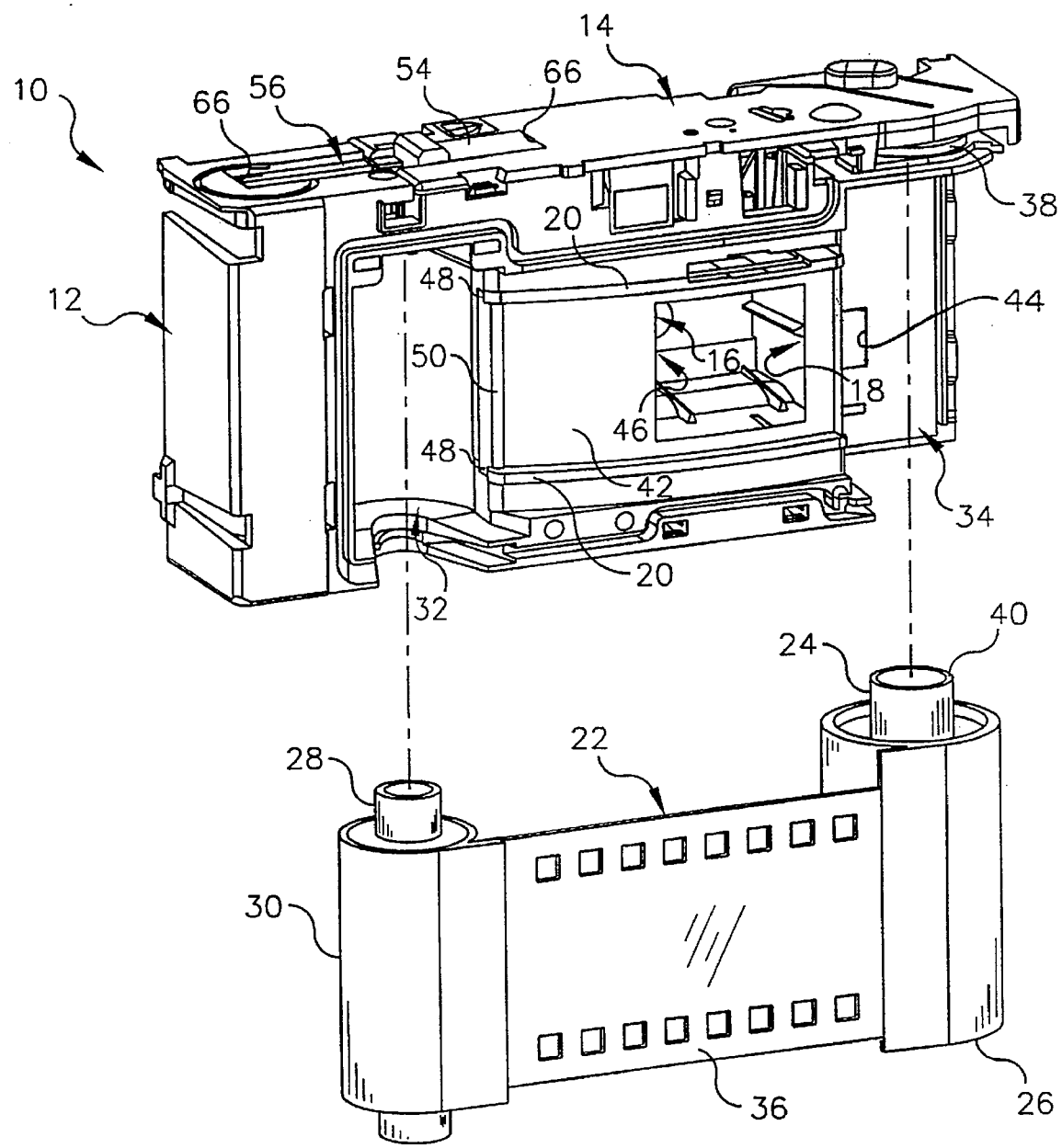

Referring now to the drawings, FIGS. 1–3 show a camera 10 including a main body portion 12 and a top cover portion 14.

The main body portion 12 comprises a shuttered lens opening 16 that opens to an exposure (back-frame) opening 18 having a normal aspect ratio 1.5:1 for 35 mm picture-taking, and a pair of curved parallel film rails 20, 20, that define a curved exposure plane for supporting successive unexposed sections of a 35 mm filmstrip 22 over the exposure opening. The filmstrip 22 has one end attached to a flanged film spool 24 rotatably supported within a known lighttight film cassette 26 and another end attached to a flanged film spool 28 rotatable within a non-lighttight cylindrical sheath 30. The sheath 30, which contains most of the filmstrip 22 wound about the spool 28 to form an unexposed film roll, and the cassette 26, which contains the end of the filmstrip attached to the spool 24, are loaded into respective storage chambers 32 and 34 in the main body portion 12. A relatively short film section 36 extending between the cassette 26 and the sheath 30 is positioned on the two film rails 20, 20 and over the exposure opening 18.

A manually rotated thumbwheel 38 is located proximate the chamber 34 to rotationally engage a protruding end 40 of the spool 24. After each film exposure is made at the exposure opening 18, the thumbwheel 38 is manually rotated one revolution to wind the exposed section of the filmstrip 22 into the cassette 26 and to advance a fresh unexposed section of the filmstrip to the exposure opening.

A flexible curtain-mask 42 includes a mask opening 44 having a panoramic-like aspect ratio 3:1 and a mask opening 46 having a square or telephoto-like aspect ratio 1:1. The curtain-mask 42 is supported for movement along a pair of parallel, open-ended, edge-guide channels 48, 48, from the chamber 32 to the chamber 34 and vice-versa, to locate the respective mask openings 44 and 46 at the exposure opening 18 to change the normal aspect ratio of the exposure opening to the panoramic-like aspect ratio and the telephoto-like aspect ratio. FIG. 1 shows the curtain-mask 42 in a non-masking position, in which the two masking openings 44 and 46 are removed from the exposure opening 18. FIG. 2 shows the curtain-mask 42 in a panoramic masking position, in which the mask opening 44 is at the exposure opening 18. FIG. 3 shows the curtain-mask 42 in a telephoto masking position, in which the mask opening 46 is at the exposure opening 18. Thus, a film exposure may be made at the exposure opening 18 which has either the normal aspect ratio, the panoramic-like aspect ratio or the telephoto-like aspect ratio.

Figure 4:
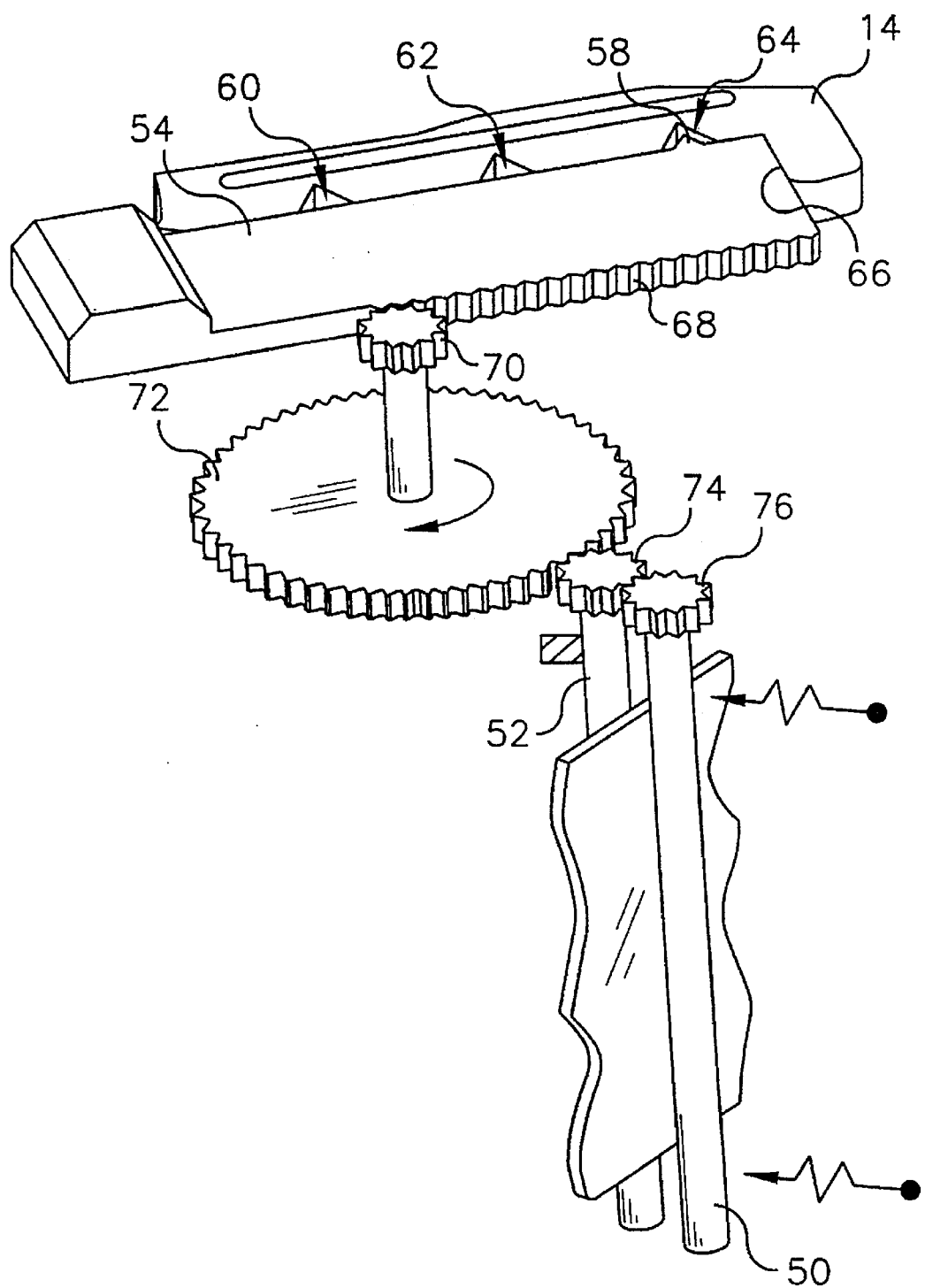
FIG. 4 is a perspective view of drive means for advancing the curtain-mask from its non-masking position to its two masking positions.

As shown most clearly in FIG. 4, one of a pair of parallel rollers 50 and 52 is spring-urged toward the other to move the curtain-mask 42 between them from one of the chambers 32 and 34 to the other chamber. A manual selection slider 54 is movable within a cavity 56 in the top cover portion 14 to three separate settings corresponding to the non-masking, panoramic masking and telephoto masking positions of the curtain-mask 42. The slider 54 includes a flexible protuberance 58 which is received in one of three notches 60, 62 and 64 in the top cover portion 14 to releasably secure the slider in its respective settings. The opposite longitudinal ends 66 of the cavity 56 limit movement of the slider 54 between its three settings. A rack 68 on the slider 54 engages a pinion 70 coaxially fixed to a relatively large-diameter gear wheel 72 which, in turn, engages a gear head 74 of the roller 52 in mesh with a gear head 76 of the roller 50 to simultaneously rotate the two rollers in opposite directions to move the curtain-mask 42 to its non-masking, panoramic masking and telephoto masking positions. FIG. 4 shows the slider 54 in its setting for locating the curtain-mask 42 in its telephoto masking position.

As can be appreciated from FIG. 1, when the curtain-mask 42 is in its non-masking position a substantial end section of the curtain-mask including the mask opening 46 is stored partially wrapped around the sheath 30 in the chamber 32. Conversely, as can be appreciated from FIG. 3, when the curtain-mask 42 is in its telephoto masking position a substantial end section of the curtain-mask including the mask opening 44 is stored partially wrapped around the cassette 26 in the chamber 34. This allows the main body portion 12 to be made relatively compact.

The invention has been described with reference to a preferred embodiment. However, it will be appreciated that variations and modifications can be effected by a person of ordinary skill in the art without departing from the scope of the invention.

PARTS LIST 10. camera
12. main body portion
14. top cover portion
16. shuttered lens opening
18. exposure opening
20, 20. film rails
22. filmstrip
24. film spool
26. cassette
28. film spool
30. sheath
32. storage chamber
34. storage chamber
36. film section
38. thumbwheel
40. spool end
42. curtain-mask
44. panoramic mask opening
46. telephoto mask opening
48, 48. edge-guide channels
50. spring-urged roller
52. roller
54. selection slider
56. cavity
58. slider protuberance
60. notch
62. notch
64. notch
66, 66. cavity ends
68. rack
70. pinion
72. gear wheel
74. gear head
76. gear head

We claim:

1. A multiple exposure-format camera comprising a pair of spaced storage chambers, an exposure opening located between said storage chambers and having an aspect ratio, a flexible curtain-mask provided with a plurality of mask openings having respective aspect ratios that are different than the aspect ratio of said exposure opening, and means supporting said curtain-mask for movement from one of said storage chambers to another of the storage chambers to successively locate said mask openings at the exposure opening to change the aspect ratio for the exposure opening, is characterized in that:

at least one of said storage chambers is configured to store a portion of said curtain-mask so that said portion of the curtain mask traverses an interior surface of at least one of the storage chambers.

2. A multiple-format camera as recited in claim 1, at least one of said storage chambers is configured to receive a film container to store said portion of said curtain-mask around the film container.

3. A multiple-format camera as recited in claim 2, wherein a manually rotated thumbwheel is located proximate one of said storage chambers to rotationally engage one end of a film spool protruding from a film container in the storage chamber.

4. A multiple-format camera as recited in claim 1, wherein said means incudes a pair of parallel rollers rotatable in contact with said curtain-mask to advance the curtain-mask from one storage chamber to another storage chamber.

5. A multiple exposure-format camera comprising a pair of spaced storage chambers, an exposure opening located between said storage chambers and having an aspect ratio, a flexible curtain-mask provided with a plurality of mask openings having respective aspect ratios that are different than the aspect ratio of said exposure opening, and means supporting said curtain-mask for movement from one of said storage chambers to another of the storage chambers to successively locate said mask openings at the exposure opening to change the aspect ratio for the exposure opening, is characterized in that:

at least one of said storage chambers is configured to store a portion of said curtain-mask so that said portion of the curtain mask traverses an interior surface of at least one of the storage chambers; and a lighttight film cassette for receiving a filmstrip exposed at said exposure opening is positioned in one of said storage chambers to store a portion of said curtain-mask around said film cassette.

6. A multiple-format camera as recited in claim 5, wherein an unexposed film roll container is located in the other storage chamber.

7. A multiple-format camera as recited in claim 5, wherein a manually rotated thumbwheel is located proximate said storage chamber in which said film cassette is positioned to rotationally engage one end of a film spool protruding from the film cassette to wind said filmstrip about said film spool.

* * * * *